US010360531B1

(12) United States Patent
Stallman et al.

(10) Patent No.: US 10,360,531 B1
(45) Date of Patent: Jul. 23, 2019

(54) ROBOT IMPLEMENTED ITEM MANIPULATION

(71) Applicant: Amazon Technologies, Inc., Seattle, WA (US)

(72) Inventors: Timothy Stallman, Groton, MA (US); Menashe Garber, Westborough, MA (US); Andrew M. Sweeney, Franklin, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/384,139

(22) Filed: Dec. 19, 2016

(51) Int. Cl.
*G06Q 10/08* (2012.01)
*G06K 19/06* (2006.01)
*G06K 7/14* (2006.01)
*G06K 19/077* (2006.01)

(52) U.S. Cl.
CPC ......... *G06Q 10/087* (2013.01); *G06K 7/1413* (2013.01); *G06K 19/06028* (2013.01); *G06K 19/07758* (2013.01)

(58) Field of Classification Search
CPC .............. G06Q 10/087; G06K 7/1413; G06K 19/06028; G06K 19/07758
USPC ............................ 235/385, 454, 462.01, 375
See application file for complete search history.

(56) References Cited

U.S. PATENT DOCUMENTS

| 4,985,846 | A * | 1/1991 | Fallon | B25J 9/1697 348/86 |
|---|---|---|---|---|
| 6,721,444 | B1 * | 4/2004 | Gu | B25J 9/1697 345/419 |
| 7,084,900 | B1 * | 8/2006 | Watanabe | G06K 9/6203 348/94 |
| 7,313,464 | B1 * | 12/2007 | Perreault | B25J 9/1666 318/568.1 |
| 8,929,642 | B2 * | 1/2015 | Ichimaru | G01B 11/2518 356/3.1 |
| 8,958,912 | B2 * | 2/2015 | Blumberg | B25J 9/0087 700/259 |
| 8,996,175 | B2 * | 3/2015 | Blumberg | B25J 9/0087 700/259 |
| 9,092,698 | B2 * | 7/2015 | Buehler | B25J 9/0087 |
| 9,238,304 | B1 * | 1/2016 | Bradski | B25J 9/163 |
| 9,434,072 | B2 * | 9/2016 | Buehler | B25J 9/0087 |
| 9,636,825 | B2 * | 5/2017 | Penn | G06Q 10/083 |
| 9,669,544 | B2 * | 6/2017 | Buehler | B25J 9/0087 |
| 9,701,015 | B2 * | 7/2017 | Buehler | B25J 9/0087 |
| 2008/0131255 | A1 * | 6/2008 | Hessler | B65B 35/50 414/788.1 |
| 2010/0039270 | A1 * | 2/2010 | Lin | G01M 11/0207 340/600 |
| 2012/0263347 | A1 * | 10/2012 | Ichimaru | G01B 11/25 382/103 |

(Continued)

*Primary Examiner* — Paultep Savusdiphol

(74) *Attorney, Agent, or Firm* — Thorpe North & Western, LLP.

(57) ABSTRACT

A technology is provided for robot implemented item manipulation. In one example, a method includes analyzing one or more items including a target item for manipulation, using machine vision rules, to identify the target item. When a determination is made that the robot is unable to perform the manipulation, a request may be transmitted requesting human assistance. An electronic response may be received in response to the request which includes an instruction for manipulating the target item. The robot may manipulate the target item using the instruction.

20 Claims, 9 Drawing Sheets

(56) References Cited

U.S. PATENT DOCUMENTS

| | | | | |
|---|---|---|---|---|
| 2012/0323358 A1* | 12/2012 | Izumi | G06K 9/34 | 700/230 |
| 2012/0330458 A1* | 12/2012 | Weiss | B66F 9/063 | 700/216 |
| 2013/0096713 A1* | 4/2013 | Takizawa | B65G 61/00 | 700/224 |
| 2013/0343640 A1* | 12/2013 | Buehler | B25J 9/0087 | 382/155 |
| 2013/0345870 A1* | 12/2013 | Buehler | B25J 9/0087 | 700/257 |
| 2013/0345873 A1* | 12/2013 | Blumberg | B25J 9/0087 | 700/259 |
| 2013/0345874 A1* | 12/2013 | Blumberg | B25J 9/0087 | 700/259 |
| 2013/0345875 A1* | 12/2013 | Brooks | B25J 9/0087 | 700/259 |
| 2013/0346348 A1* | 12/2013 | Buehler | B25J 9/0087 | 706/12 |
| 2015/0032252 A1* | 1/2015 | Galluzzo | B25J 5/007 | 700/218 |
| 2015/0262012 A1* | 9/2015 | Kim | G06K 9/3241 | 382/103 |
| 2015/0290802 A1* | 10/2015 | Buehler | B25J 9/0087 | 700/257 |
| 2015/0290803 A1* | 10/2015 | Buehler | B25J 9/0087 | 700/257 |
| 2015/0360865 A1* | 12/2015 | Massey | B65G 1/1373 | 414/275 |
| 2015/0375398 A1* | 12/2015 | Penn | G06Q 10/083 | 700/218 |
| 2016/0001445 A1* | 1/2016 | Setsuda | B25J 9/1679 | 700/260 |
| 2016/0089791 A1* | 3/2016 | Bradski | B25J 9/163 | 700/214 |
| 2016/0253562 A1* | 9/2016 | Yuki | G06T 7/73 | 382/153 |
| 2016/0379370 A1* | 12/2016 | Nakazato | G06K 9/4604 | 382/103 |
| 2017/0057092 A1* | 3/2017 | Ito | B25J 9/1697 | |
| 2017/0151673 A1* | 6/2017 | Kobayashi | B25J 9/1697 | |
| 2017/0183157 A9* | 6/2017 | Massey | B65G 1/1373 | |
| 2017/0323253 A1* | 11/2017 | Enssle | G06Q 10/087 | |

\* cited by examiner

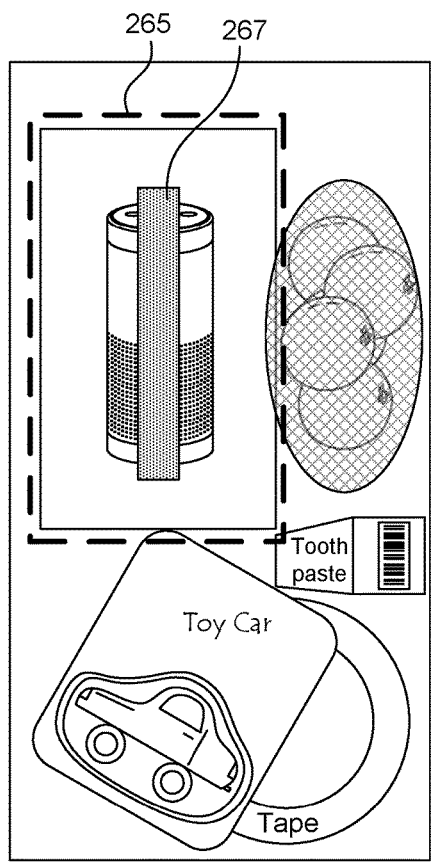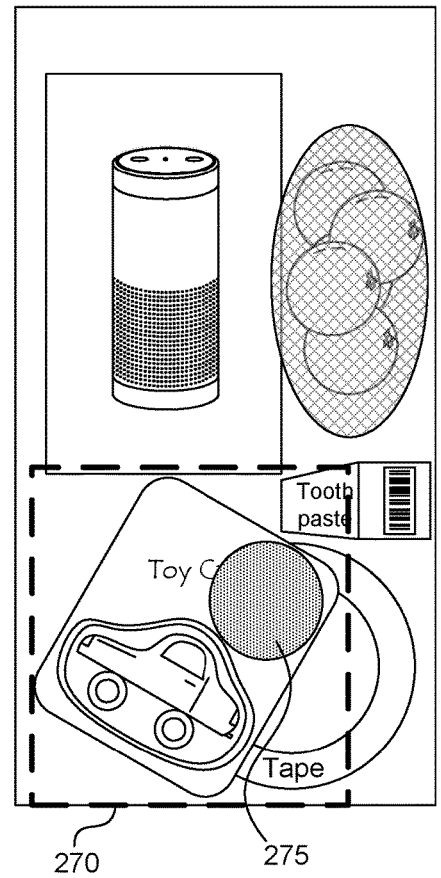
*FIG. 2B*  *FIG. 2C*

US 10,360,531 B1

ROBOT IMPLEMENTED ITEM MANIPULATION

BACKGROUND

Modern inventory and warehouse systems, such as those in electronic retailer order warehouses, supply chain distribution centers, airport luggage systems, automated and semi-automated warehouses, and custom-order manufacturing facilities, face significant challenges in responding to requests for inventory items. As inventory systems grow, the challenges of simultaneously completing a large number of placing, retrieving, packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, less efficient system performance. Additionally, expanding the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

The order fulfillment step in the distribution system and process for products dispensed is often one of the largest cost components in moving inventory from production to end consumer. Final order assembly is typically labor intensive and time consuming as human operators move among inventory locations and manually handle items. These developments have taken the form of pick-to-light technology, wireless barcode readers, conveyor systems that move orders, to operators and even automated storage and retrieval systems ("A SRS") that bring the inventory to the worker. Another type of solution, known as a sorter, is used in conjunction with inventory storage equipment and comprises a revolving mechanism that helps sort items coming from inventory into target order bins. Yet another solution is to provide fixed racking aisles served by a robot that moves in and out of the aisles to bring inventory to the front of the storage system. These solutions have been used by the distribution industry for their ability to streamline operations and cut operating costs. Yet even with these often expensive systems, fulfillment costs remain high and distribution system managers continue to explore ways to reduce operating costs.

BRIEF DESCRIPTION OF THE DRAWINGS

FIGS. 2A-2D illustrate a graphical user interface for marking parts of an image in response to a robot request for assistance in accordance with an example of the present technology.

DETAILED DESCRIPTION

Figure 1:
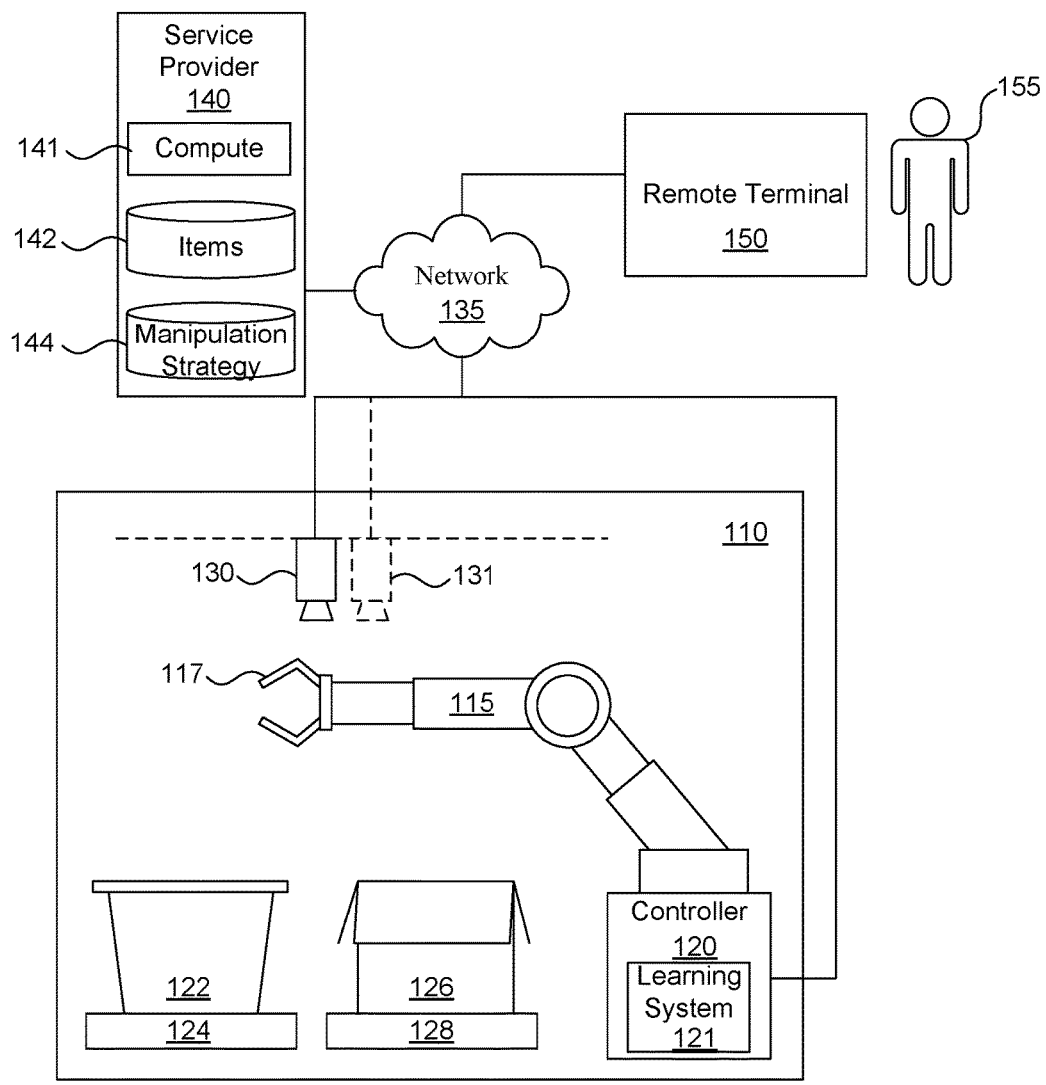
FIG. 1 is a diagram illustrating a robot implemented picking system with remote assistance in accordance with an example of the present technology.

A technology is provided for robot implemented picking of objects, which may also use human assistance when a robot is unable to perform the picking task. In one example, a method includes analyzing one or more items including a target item for picking, using machine vision rules, to identify the target item, and further analyzing how to perform the picking. When a determination is made that the robot is unable to perform the picking, an electronic request may be transmitted requesting human assistance. An electronic response may be received for the request which includes an instruction (e.g. an electronic instruction originating from a human assistance device controlled by a human) for picking the target item. The robot may then pick the target item using the instruction.

In a more specific example, a method for human directed robotic pick operations may include capturing an image of the one or more items, including the target item, to be picked and placed at a destination. The image may be two or three dimensional, and may include one or more photographs, videos, virtual models, overlays, or other visual representations of the one or more items or the destination, etc. The image may be a virtual representation, and may be viewable using a suitable display device, with non-limiting examples such as a computer monitor, virtual reality headset, augmented reality glasses, holographic display and so forth, which may optionally allow the user to change a field of view or perspective. The method may include machine analyzing the image to identify the target item, how to pick the target item, and the destination. A failure condition may be determined to exist when the robot is unable to pick and/or place the target item. The image captured may be transmitted to a human assistance device together with a request for human assistance, where the human assistance is to be provided based on the image. In response, an instruction associated with the image may be received from the human assistance device for picking or placing the target item. The robot may proceed to pick and place the target item at the destination using the instruction.

Examples herein are directed to an inventory system having inventory containers, such as boxes, crates, totes, shelves, etc. The examples herein are also directed to robotic arms or manipulators and associated components that may facilitate the movement of inventory items and other features of the inventory system among and between elements of the inventory system. A robot, as used herein, may refer specifically to the robotic arm or may more broadly refer to the mechanical manipulator (e.g., a robotic arm), as well as related or supporting apparatus around the mechanical manipulator, including a controller, and software for use by the controller in controlling the mechanical manipulator and/or other apparatus which is part of the robot. The robotic arms or manipulators may be controlled so as to manipulate items in a manner particularly suited for manipulating of a target item (e.g., grasp, suction, magnetic attraction, etc.). For example, a target item, or characteristics thereof, may be identified, such as by optical or other sensors, in order to determine a manipulation strategy for the item. The manipulation strategy may be based at least in part upon a data store containing information about the item, characteristics of the item, and/or similar items, such as information indicating manipulating strategies that have been successful or unsuccessful for such items in the past. Entries or information in the data store regarding manipulating strategies may be originated and/or updated based on human input for manipulating strategies, determined characteristics of a particular item, and/or machine learning related to manipulating attempts of other items sharing characteristics with the particular item.

The robot may use machine vision to identify the inventory item and determine how to manipulate the item. However, there are a significant number of instances in which machine vision is unable to 'see' or properly analyze the target item or packaging around the target item, or how to pick up an item whether or not the machine vision 'sees' or properly captures the target item or the packaging. Human assistance may be used to overcome these difficulties. However, providing human employees at the site of the robot may be inefficient for various reasons. These reasons may include issues including: the rate at which failures are encountered may be infrequent for an individual robot, human assistance in some locations may be expensive and cost-prohibitive, and so forth. The present technology enables a human to provide remote assistance. An individual human may be able to quickly and easily provide just enough information for the robot to perform the picking operation, and may be able to do so efficiently for a large number of robots located anywhere in the world. The system may be a learning system that learns from previous requests for human assistance.

In an illustrative example, a robotic arm is positioned within reach of a tray. The tray may be loaded with an inventory item (for example a coffee mug) that is to be grasped by the robotic arm and moved into the appropriate box selected from a group of boxes that are awaiting ordered items for shipment to customers. The mug in the tray may be identified according to appearance, a unique identifier number, or the like. For example, a unique identifier may be a scanned barcode or radio frequency identification tag. The optical recognition of the mug from the appearance, the unique identifier of the mug, or the like may be used to access a record about the mug from an item data store to determine a stored weight and a stored digital model representing the shape of the mug. A camera or other optical imaging device scans the mug, providing information about the mug's orientation, e.g., in this case that the mug is on its side with the open top facing the camera and the handle to the right. The weight, shape, and orientation of the mug are collectively used with any other relevant and/or available information (e.g., about the size and orientation of the box into which the mug is to be placed to fulfill the order) to query a manipulation strategy data store for a manipulation strategy appropriate for this situation. Assuming multiple strategies are available, the highest ranked strategy is accessed, which in this example may cause the robotic arm to use a vacuum end effector (rather than an electromechanical pincher that is also available), approach the mug from the open top to grasp the mug on the bottom inside of the mug using 60% of the robotic arm's suction capacity, and rotate while moving toward the target box so that the mug is set down with the bottom facing down and the handle aligned in a foam slot specially formed in the left side of the box to receive the handle. Alternatively, assuming that no strategies are available for this situation, new manipulating strategies may be generated. For example, manipulating strategies for similar items (such as, other mugs, other items determined to be similar in shape to mugs, etc.) may be accessed and/or adapted to provide a manipulation strategy for the mug presented to the robotic arm. As another example, a remote human operator may provide input about how the mug may be effectively manipulated by the robotic arm, such as by marking up an image of the mug using graphical marks on a graphical user interface.

Referring to FIG. 1, an inventory system is illustrated which includes a robot. Specifically, the robot may be a robotic arm 115 and/or manipulator (e.g., end effector 117) configured to manipulate inventory items. Although the drawing illustrates a robotic arm 115, any other mechatronic or robotic device may be used in lieu of or in addition to an arm. Additionally, the terms "manipulation", "grasping," "gripping," or the like as used herein should be understood to include any physical manipulation of objects, including, but not limited to, picking up, pushing, pulling, lifting, dragging, compressing, stretching, and moving. The system may include the robotic arm 115, one or more inventory containers 122, 126 containing one or more inventory items, a sensor (e.g., a camera 130, 131), and a network connection 135 from the robotic arm 115 and camera 130/131 to a remote terminal 150 with a human operator 155. A controller 120 may be configured to control movement of the robotic arm 115, to send or receive communications, which may include instructions for use or movement of the robotic arm 115, process image data, etc. as will be described. The system may include a staging environment 124, 128, such as a platform, table, stand, or any other structure or environment maintaining or supporting an inventory item or inventory container. The staging environment may include or correspond to an inventory container. The robotic arm 115 may be in or part of an inventory management system or location 110.

The robotic arm 115 may include or be in communication with one or more sensors (of similar or varying types) arranged to detect the item while the item is being targeted by the staging environment. The sensors may communicate detected attributes, such as weight, geometric characteristics (e.g., size, position, or orientation), electrical conductivity, magnetic properties, surface characteristics (e.g., how slippery or porous the item is), deformability, and/or structural integrity of the item. The detected attributes may also include a unique identifier of the item, such as a barcode or RFID encoded serial number, or other suitable identifier. Based on the detected attributes, the controller may access an items data store 142, such as to access a record for the inventory item. The record can include information about attributes of the item, such as weight, size, shape, or other physical characteristics of the item. Based on the record from the item data store 142 and/or the detected attributes from the sensor(s), the controller may access a manipulation strategy data store 144 to access an item manipulation strategy stored for that item or items with similar characteristics. The controller can provide instructions to the robotic arm for manipulating the item based on the manipulation strategy accessed from the manipulation strategy data store 144.

One or more of the sensors may be an image sensor in the form of a camera 130, 131. The camera 130, 131 may capture an image of the staging environment, such as a top-down view (other views such as side or bottom views may also be used). Machine vision may be used to recognize the inventory items, the shape and location of the inventory items, the destination for placing the inventory items, etc. Movement of the robotic arm 115 and manipulation of the inventory items may be based at least in part on the images captured by the camera 130, 131. The camera 130, 131 may capture still images and/or video. The camera 130, 131 may be further optionally configured to capture audio or may be in communication with an audio capture device, such as a microphone, to synchronize the image or video capture with audio capture. The camera 130, 131 may be operable by the controller 120. One or more cameras 130, 131 may be provided. The one or more cameras 130, 131 may be used to create a stereoscopic image or to render a three dimensional image from a combination of image data from multiple cameras or from a single camera moved to one or more different positions. In one example, multiple different cameras may be used for different purposes. A first camera, such as camera 130, may be configured to capture images for recognition by the robot. A second camera, such as camera 131, may be configured to capture images for transmission to the remote terminal 150. The first and second cameras 130, 131 may be the same camera type or may be different camera types. The first and second cameras 130, 131 may be positioned and oriented substantially the same or may have different orientations. For example, the first camera may be attached to the robotic arm 115, may include a wide angle lens, and may capture images using an infrared image sensor. The second camera may be fixed in a position above the staging environment with a standard lens or zoom lens, and may capture images using a visible light image sensor.

In a scenario where a manipulation strategy from the manipulation strategy data store 144 is not available or not complete, human input for a manipulation strategy may be requested and received by the controller. Specifically, a human operator may be available at a remote terminal 150. The remote terminal 150 may receive requests from a plurality of robots and may be located anywhere in the world. Together with the request for assistance, the robot may send an image of the staging environment. The image may include one or more still images. Optionally, the image may include streaming video or streaming audio. The image may include a three dimensional image or three dimensional model. Upon viewing the image, the human operator 155 may provide an instruction regarding how the inventory item may be manipulated by the robotic arm. The instruction may be entered at the remote terminal 150 and may be transmitted over the network 135 to the controller 120. As non-limiting examples, the remote terminal 150 may include a computer interface by which the human operator 155 may input instructions. The manipulation strategy provided by the controller 120 to the robotic arm 115 may be based on the instruction received from the remote terminal 150 for manipulation strategy, the detected attributes of the inventory item(s), the record accessed from the items data store 142, the information accessed from the manipulation strategy data store 144, and/or any combinations thereof.

The controller may include a learning system 121. The learning system may update the manipulation strategy data store 144 and/or the items data store 142 based on the instruction received from the remote terminal 150 and/or detected attributes of the inventory item(s), either of which may include feedback about the success of the manipulation strategy implemented. Such updating and accessing of the items data store and/or the manipulation strategy data store may enable additional robotic arms throughout the inventory system (and throughout any other inventory systems having access to the items data store and/or the manipulation strategy data store) to be used to more effectively move inventory items so as to increase efficiency and throughput. Additionally, the learning system 121 may make inferences from successful or failed manipulation attempts in the past for picking or placing similar items that have not been previously picked or placed, or which are oriented differently, etc.

The system may be intended to function fully automatically without human intervention, but the system may enable a robot to request assistance when a failure condition occurs, such as when the controller is unable to determine how to manipulate a target inventory item, unable to determine a location of the inventory item, unable to determine a destination for the inventory item, etc. By having a remote operator available to provide minimal instruction in response to requests, a single human operator may provide assistance to any number of robots located anywhere in the world quickly and efficiently. The remote operator may not actually receive rights or access to control the robot but the remote operator may provide just enough assistance in the form of simple, basic instructions, to enable the robot to complete a pick and place operation.

While FIG. 1 illustrates the controller 120 as being located near or even as part of the robotic arm 115, the controller may be separate from the robot and may be physically distant from the robotic arm 115. For example, at least a portion of the operations performed by the controller 120 may be provided to the robotic arm 115 over the network 135, such as from a service provider 140 environment for providing storage, compute 141 and other services. For example, the service provider 140 may store and make accessible the items data store 142 and the manipulation strategy data store 144. Alternatively, these data stores may be local to the controller 120 and/or robotic arm 115. The compute 141 service may provide networked compute capacity for the controller 120. For example, at least a portion of the compute operations performed by the controller 120 in analyzing items to be picked, determining how to pick the items, interpreting instructions received from the remote terminal 150, etc. may be performed by the compute 141 service. In one example, the compute 141 service may include a physical or virtual server with a processor to process data and perform the various compute operations.

While a robotic arm 115 is illustrated in FIG. 1, other types of robotic devices, or robots, may also be used. Robots are used in many industrial or commercial applications in which speed and flexibility are required in connection with the performance of automated tasks. For example, robots are frequently provided in suspension over conveyors and configured to grasp or move objects passing along the conveyors, and to place such items in a designated receptacle. Such operations take advantage of the lightweight nature of arm linkages and the flexibility with which the linkages may reposition an end effector within an environment. In this regard, a robot may be programmed to quickly and efficiently complete a task using one or more tools or other devices provided on an end effector, even in a fast-paced environment in which objects are traveling rapidly or in multiple directions. Such tools or devices may include any number of actuation mechanisms that may be independently controlled by the same controller or control system that operates the arm linkages, carriages, motors or other aspects of the robot itself, or a different controller or control system. Moreover, robots are frequently provided with specifically programmed software applications or hardware components that enable the arm linkages, carriages, motors or other aspects to operate in response to one or more control signals. In the robotic arm example, the robot may include one or more arm linkages extending between a base and an end effector, with the arm(s) of the arm linkage(s) being pivotally mounted to the base and the end effector. The arm linkages enable the end effector to be suspended above a working surface, and may be configured to be raised and lowered such as by using a motor that may be operated by the controller 120. Additionally, the arm linkages may be operated in a manner that causes the end effector to either rise or fall, or translate in any horizontal direction. Each of the arms in the arm linkages may be constructed from several concentrically joined sections, each of which can be rotated and translated in a three-dimensional space so as to achieve a desired position of the end effector of the robotic arm, and thus achieve a desired position and orientation of the end effector in three-dimensional space.

Figure 2A:
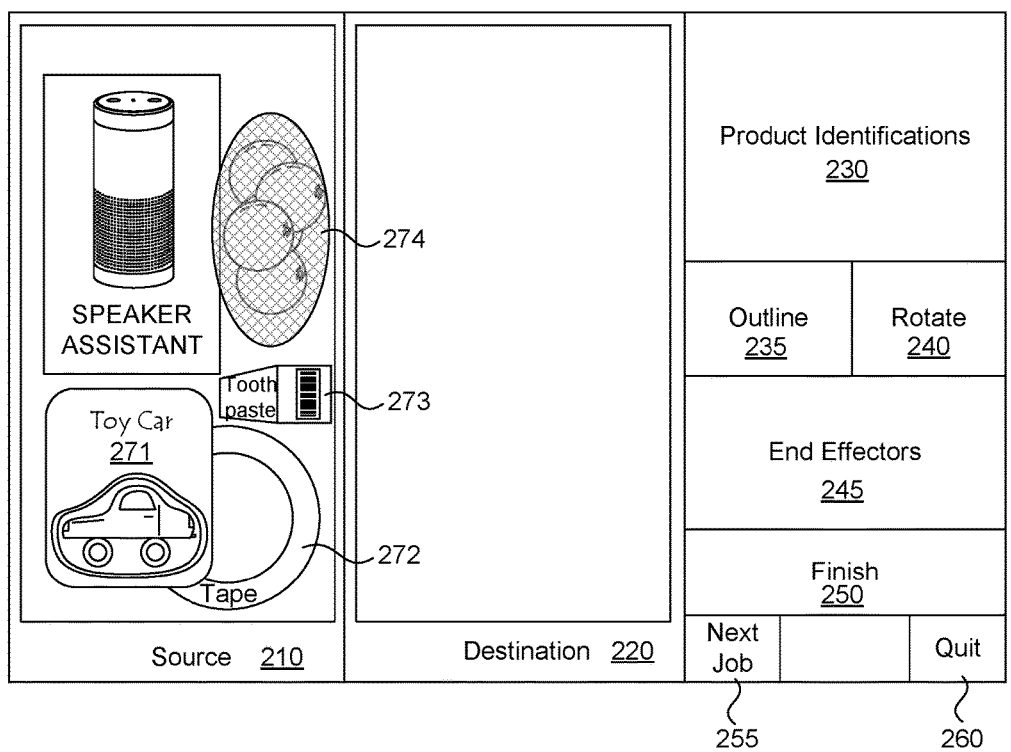

Referring to FIGS. 2A-2D, examples of an interface and instructions for pick and place assistance are illustrated. Specifically, FIG. 2A illustrates an example graphical user interface that may be displayed to a remote operator for providing instructions to a robot. The example interface includes an image of a source location 210, or rather an image of a location from which the robot is attempting to pick a target item. The source location 210 may include a box, bin or other inventory container. The example interface further includes an image of a destination location 220. The destination location 220 may include a box, bin or other inventory container. The source location 210 and destination location 220 images may be a single image that includes both the source location 210 and the destination location 220. Alternatively, the source location 210 and destination location 220 images may be a plurality of separate images captured separately by a same camera or multiple cameras, or may be divided portions of what was previously a single image. The images captured in this example are from a top view of the source and destination, but other perspectives are also contemplated. In this example, the destination inventory container is empty as no inventory items have yet been placed at the destination.

The interface provides options to the remote operator for marking the image(s) at the source location 210 and/or destination location 220. For example, the interface may include options such as, 'product identifications' 230, 'outline' 235, 'rotate' 240, 'end effectors' 245, 'finish' 250, 'next job' 255 and 'quit' 260. The 'product identifications' 230 options may enable the remote operator to see what inventory items are expected to be at the source and/or destination, what inventory item the robot is attempting to pick and place, identification numbers and/or images of the inventory items, etc.

The 'outline' 235 option may enable the remote operator to draw an outline around an item in the image. The outline may be a rough outline that roughly outlines the portion of the image including the item. The outline may be drawn by tracing, clicking/tapping and dragging to form a shape, placing predefined shapes on the image, and/or any other suitable form of creating an outline or otherwise identifying a portion of the image representing the item to be picked. Outlining a portion of the image may copy that portion of the image and render the copy portion movable to the destination. The 'outline' 235 option may be used in connection with the 'product identifications' 230 option. For example, if the robot is having difficulty identifying the target item, in addition to outlining the target item the remote operator may optionally also select which item (e.g., a product item type or product item name) has been outlined from the 'product identifications' 230 option. The identification of the item may be attached to the marked image as metadata or may be visually represented on the image, such as in the form of text, colors, symbols or other representations which will be recognizable by the robot.

The 'rotate' 240 option may be used after an item has been outlined in order to rotate the copy portion. The copy portion may be rotated, in this example, in two dimensions to any degree of rotation. In examples where the image is three dimensional or is a three dimensional model or the like, the image may be rotated in three dimensions. The rotation may be performed to place the copy portion in a desired position and desired orientation at the destination.

The 'end effectors' 245 option may be used to select an end effector desired to be used for picking the item. Selection of the 'end effectors' 245 option may enable selection of one of multiple available end effectors, and may further enable configuration of the end effector, such as a degree of suction, an angle of rotation, angle of inclination, size of grasper, etc. The end effectors may be associated with a shape, color or pattern. The remote operator may select a portion of the image at the source to identify a place for the end effector to capture (e.g., grasp or suction) and pick up the target item. The shape, color, or pattern may provide a visual indication to both the remote operator and to the robot which end effector is selected and a location to place the end effector with respect to the item in order to pick up the item, and the location indication may identify an orientation of the end effector. The operation and effect of the 'outline' 235, 'rotate' 240, and 'end effectors' 245 options will be more apparent in the following discussion of FIGS. 2B-2D. The type of end effector, positioning of the end effector and rotation of the end effector may be visually represented. Other configurable options, such as degree of suction, angle of inclination, etc. to use when grasping an item may be visually represented or may be attached to the image in the form of metadata. For example, a degree of suction may be indicated by different shades of a color, by different colors, or by different patterns of a shape representing the selected end effector. As another example, a degree or angle of inclination may be indicated by skew or stretching of a shape indicating a selected end effector.

The 'finish' 250 option on the interface may enable the remote operator to finish instructions for the request for assistance. Selection of the 'finish' 250 option may result in the marked up images being transmitted to the robot as instructions. Selection of the 'next job' 255 option will load images for the next request for assistance, which may be from a same or different robot. The 'quit' 260 option allows the remote operator to terminate a remote assistance session.

The interface may be used to provide any suitable information in response to the request. In an example, the information used to pick up and place an item includes four pieces of information. These pieces of information may include one or more of what the item is (such as an identification of a name, unique identifier (e.g., barcode), or the like), where the item is, where the item is to be placed, or how or where to suction/grasp/etc. to pick up and move the item. The interface may expose limited control to a human. In other words, the interface may enable simple response instructions but is not configured for tele-operation of the robot. Also, the interface may be dynamic and may adjust based on the context of the picking operation. For example, if a robot does not have both grasp and suction end effectors, the interface may adjust to not show the missing end effector and simply show the end effector(s) available.

Referring to FIG. 2B, a marked source image is shown. A target item in the source image has been outlined with a rectangular outline 265. The outline 265 approximates a shape of the target item. The visual appearance of the outline 265 in this example is a thick, dashed line. However, other variations may also be implemented. Selection of an outline that is easily recognizable against an image may assist the robot in quickly identifying the instructions. The robot may analyze the image for patterns, colors, etc. that match what is known to be an outline or may compare the marked image against an original image as transmitted with the request for assistance to identify what has changed.

In the example of FIG. 2B, in addition to outlining the target item, an end effector marking 267 has been placed over the outlined item. Selection of an end effector marking 267 that is easily recognizable against an image and distinguishable from the outline 265 may assist the robot in quickly identifying the instructions. The robot may analyze the image for patterns, colors, etc. that match known end effector markings 267 to identify the end effector instruction(s). In this example, where the end effector is represented by a rectangular shape, the orientation of the rectangle may indicate an orientation of the end effector when picking up the item. While in this example, the end effector is indicated by a specific shape, in another example, the remote operator may free-hand draw a shape or line over the target item. A color or pattern of the free-hand drawing may indicate the end effector to be used, at least if multiple end effectors are available, and dimensions of the free-hand drawing may be used to determine an orientation of the end effector, if applicable.

FIG. 2C illustrates another example instruction. In this example, the target item is not aligned with the staging environment as was shown in the example of FIG. 2B. However, a rectangular outline 270 may still optionally be used to identify the target item. The outline 270 encompasses at least a portion of the target item and may optionally encompass at least a portion of one or more other items, as shown in this example. Other outline configurations may alternatively be used to more closely approximate the outline of the target item, such as different outline shapes, different outlining methods (e.g., free-hand tracing, drag and drop shapes, etc.), and so forth. The robot may optionally use edge detection or other image recognition techniques to identify the target item in the selection. In this example, the robot may have been able to identify the target item but have had difficulty picking the target item up due to the blister pack packaging. Indication of where to place the end effector may be the instruction requested by the robot. In such an instance, the remote operator may simply indicate where to place the end effector without outlining the target item. The end effector marking in this example is marking 275.

In some examples, such as if the robot has identified the target item but has difficulty picking it up, the robot may at least partially mark up the image before sending the image with the request for assistance. The outline 270 in FIG. 2C may be an outline 270 identified by the robot indicating to the remote operator that the robot has identified the outlined portion of the image as corresponding to the target item. If an end effector marking 275 (as attempted to be identified by the robot or machine vision software) is missing or placed where the robot cannot effectively grasp the target item, the remote operator may simply place the end effector marking 275 at an effective grasping location within the selection 270. In other words, the robot and machine learning and vision software may attempt to do as much of the work as possible and the instruction from the remote operator may be minimal and may be limited to the work the robot is unable to perform.

Figure 2D:
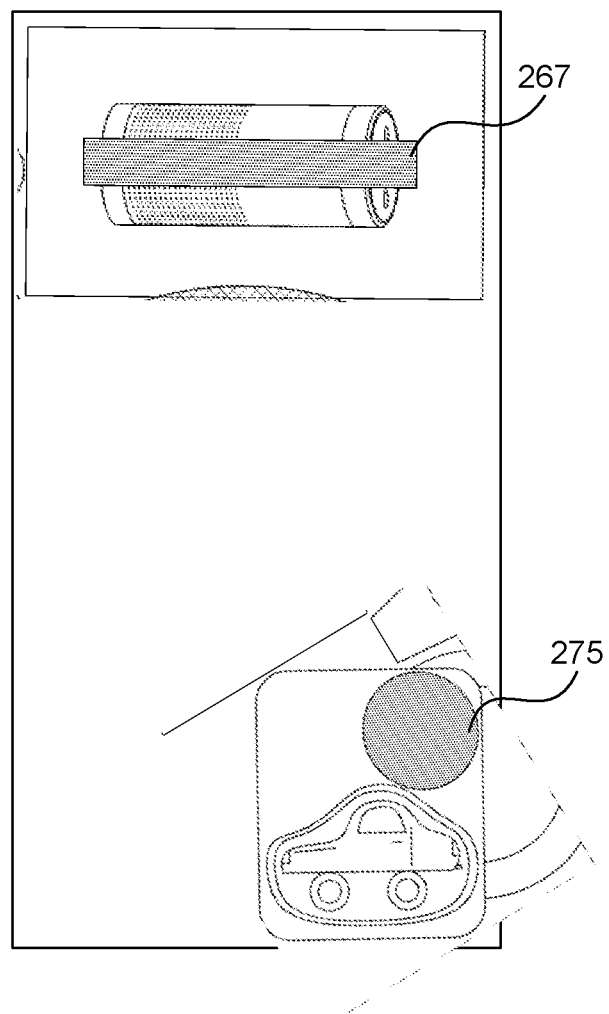

The remote operator may provide instructions for one item, for multiple items, or for every item to be picked in a particular job. FIG. 2D illustrates an example where the remote operator has provided instructions for placing the outlined target items of FIGS. 2B and 2C at a destination. As shown in FIG. 2D, the outlined selection from the image is moved to the destination, such as by dragging and dropping in the interface of FIG. 2A. The target items of both FIGS. 2B and 2C have been rotated to fit better at the destination, such as to maximize usable space in a container at the destination. The destination image of FIG. 2D may be part of the instructions to the robot and may indicate where to place the items and at what orientation. The instruction from a remote terminal may instruct where to place the item such as by the indication where to place the end effector. Placement of the end effector marking 267, 275 may inform placement of the selection. The target item of FIG. 2C in this example, as rotated, has a selection which extends beyond the boundaries of the destination container. However, the target item within the selection is within the boundaries of the destination container, so placement of the end effector in the location at the destination as shown will result in correct placement of the target item despite the selection boundaries extending beyond the container boundaries.

Plastic wrap, specular coatings, mesh bags, partially obscured items, items that are at an angle, etc. are example issues which may increase the difficulty for a robot to identify the target item or to determine how to grasp the target item. The source images in FIGS. 2A-2C include an item in blister pack packaging (i.e., the toy car 271), a partially obscured item (i.e., the roll of tape 272), an item tipped on its end (i.e., the toothpaste 273), and mesh packaging (i.e., the bag of oranges 274). These are non-limiting examples of scenarios in which a robot may request assistance in picking up and/or placing one or more target items. Where the roll of tape is partially hidden behind the toy car, the robot may have difficulty recognizing the tape using machine vision. Where the toothpaste box is at an angle, identification may be difficult (however, since the product barcode is displayed on the end of the box, the robot may be able to scan the barcode to recognize the item). Where the oranges are in a mesh bag, the robot may have difficulty 'seeing' the mesh bag.

Inventory containers store inventory items. In one example, inventory containers include multiple storage bins with each storage bin capable of holding one or more types of inventory items. Inventory containers may be capable of being carried, rolled, and/or otherwise moved. Inventory items may be placed, stacked or arranged in bins, hang from hooks or bars within or on inventory containers, etc. In general, inventory containers may store inventory items in any appropriate manner within the inventory containers and/or on the external surface of inventory containers. In one example, each inventory container may include a plurality of faces, and each bin may be accessible through one or more faces of the inventory container.

Inventory items represent any objects suitable for storage, retrieval, and/or processing in an automated inventory system. For the purposes of this description, "inventory items" may represent any one or more objects of a particular type that are stored in an inventory system. Thus, a particular inventory container is currently "storing" a particular inventory item if the inventory container currently holds one or more units of that type. As one example, an inventory system may represent an electronic order warehouse facility, and inventory items may represent merchandise stored in the warehouse facility. Moreover, boxes containing completed orders may also represent inventory items.

Figure 3:
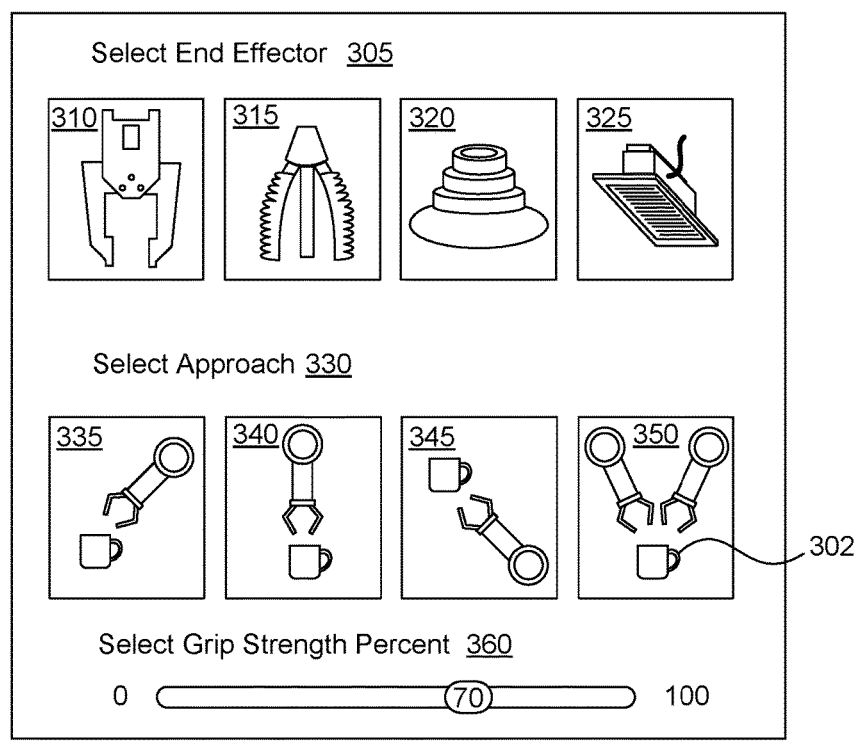
FIG. 3 illustrates a graphical user interface for selecting an end effector, approach, and strength of grasp for instructing a robot in accordance with an example of the present technology.

FIG. 3 illustrates example end effectors and a sample user interface for the remote operator to use in providing instructions in an image in response to the request for assistance. The user interface includes a display showing various selection options that a human user may select to provide input about a manipulation strategy for a particular item, e.g., a coffee cup 302. In a first row at 305, the user has options for different end effectors, such as a mechanical pincher 310, soft robotics 315, vacuum 320, or electro-adhesion 325. The user may select one or more of the end effectors. In a second row at 330, the user may select an approach for picking up the desired item. For example, the presented options may include an angled or lateral approach 335, a top-down approach 340, an underneath approach 345, or a multiple arm approach 350 (in which multiple arms are used for manipulating and moving the item). The user may select an approach (or more than one approach in the case of multiple robotic arms). In a third row at 360, a user may select a grip strength, such as in terms of percentage, for the strength of grip to be provided by the selected end effector.

Figure 4:
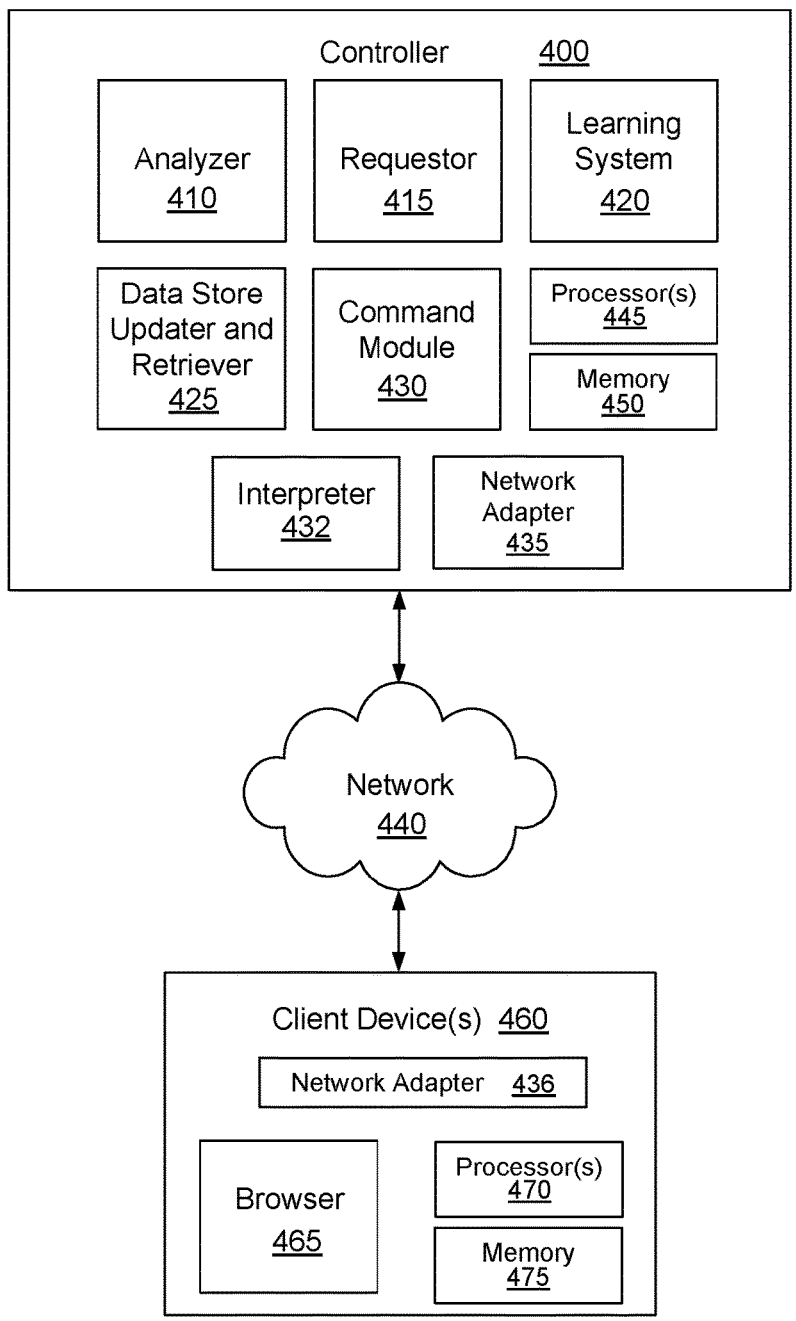
FIG. 4 is a block diagram illustrating a portion of a robot implemented system, including a controller, in accordance with an example of the technology.

Referring now to FIG. 4, a block diagram of a portion of a robot implemented picking system is illustrated in accordance with an example of the present technology. The system elements may be implemented using one or more computing devices in an inventory management system, as well as client devices which may be external to the inventory management system and/or in communication with the inventory management system via a network. The system may include one or more data stores (see FIG. 1) and a number of modules, functions, or services.

As has been described and illustrated, a robotic picking system may include a robot with an arm having at least one end effector configured for picking up items. The system may include at least one camera configured to capture images of the items. Network adapters 435, 436 may enable electronic communications between the robot and a remote human assistance device, or rather a remote terminal or client device 460, over a network 440. The system may include a controller 400 for controlling the robotic arm, communicating requests for assistance, providing instructions to the camera to capture images, analyzing images from the camera for determining how to pick up inventory items, and so forth. The controller 400 may include a processor 445 and a memory 450 in electronic communication with the processor 445. The controller 400 may further be provided with computer instructions stored in the memory 450 and which are executable by the processor 445 to perform one or more functions.

The controller 400 may use a command module 430 to instruct a camera to capture an image including a target item. The controller 400 may use an analyzer 410 to analyze the image and detect attributes of the inventory items which are detectable from the image. The analyzer 410 may also be used to detect attributes of the inventory items, such as from other sensors from which data may also be available to the controller 400, as has been described. The controller 400 may use a data store updater and retriever 425 to retrieve data from one or more data stores to identify the inventory items in the image, to identify which inventory item(s) to pick, identify how the inventory item is to be picked and so forth. In some examples, however, the controller 400 may encounter difficulty in identifying inventory items, determining how to pick up inventory items, etc. particularly if a specific inventory item has not been previously picked. A failure condition may exist when the controller 400 is unable to determine what the item is, where the item is, where to place the item, how to pick up the item, etc. When encountering a failure condition, the controller 400 may request human assistance from a human assistance device using a requestor 415. The human assistance device, or client device, may be a remote client device or remote terminal in electronic communication with the controller over a network, such as the internet. The controller 400 may use the network adapter 435 to send and receive electronic communications over the network 440.

The controller 400 may transmit the image captured with the camera to the client device 460. In one example, the camera may comprise a plurality of cameras and the controller 400 may analyze an image from a first camera for machine vision identification of the inventory items and the controller may transmit an image from a second camera that is configured for human review or markup. The robot may optionally mark the image with one or more markings indicating the information the robot has identified from the image, such as the location of the inventory item, where the item should be placed, or any other information related to the picking that has been able to be determined. The markings may be similar to markings that a human at the human assistance device may make or be expected to make. Some example markings with explanations of how the markings may be interpreted have been described and illustrated. Optionally a portion of the information the robot has determined for use in picking the target item may be embedded as metadata in the target image and may be displayed to the human at the human assistance device. In order to expedite the process, the instructions requested and received may be minimal and limited to what the robot is unable to determine on its own.

The instructions may include non-alphanumeric markings and may include one or more lines or shapes. In one example, the instructions include one or more of at least a partial outline of the target item on the marked image, a line designating an orientation of at least one end effector for picking up the target item, the destination for placing the target item, an orientation of the target item for placing at the destination, where on the target item to use the end effector to pick up the target item, or which of a plurality of available end effectors to use to pick up the target item, etc. The instructions may be coded using specific coloration or patterning.

The controller 400 may receive a marked image from the human assistance device. The marked image may be received in response to the request for assistance. The controller 400 may use the analyzer 410 to analyze the marked image to identify pick and place instructions for picking or placing the target item. Specifically, the controller 400 may utilize an interpreter 432 which may interpret the instructions received from the human assistance device. For example, the interpreter 432 may compare the image markup to a data store correlating image markings with robot usable instructions. The interpreter 432 may interpret or translate the image markings into robot usable instructions, which may be specific to a specific robot or which may be generic to many robots. For example, the interpreter 432 may convert the image markings into a markup language schema, such as JSON (JavaScript Object Notation).

While the instructions are primarily described herein in the example of image markup, the instructions may be in any other suitable format. For example, where the image is a virtual reality image or environment, the human may use a virtual reality headset with a connected glove or controller. The human may physically reach and grab the item and move the item in the virtual environment. The selections and movements by the human may be recognized and interpreted by the interpreter 432 into instructions usable by the robot to perform a similar operation for picking and placing the physical item. As another example, the human may provide verbal instructions which may be recorded by a microphone. The verbal instructions may be returned to the robot as an audio recording or as a transcription and may be interpreted by the interpreter 432 using natural language processing and rules for converting the verbal instructions into JSON instructions.

After identifying the instructions, the controller 400 may use the command module 430 to provide instructions to the robotic arm. In other words, the controller 400 may control the arm to pick up the target item and to place the target item at a destination based on the pick and place instructions identified in the marked image. The controller 400 may use the learning system 420 in combination with the data store updater and retriever 425 to update the one or more data stores with information such as the identification of the target item, whether the target item was able to be picked up, how the target item was picked up (or attempted to be picked up), etc. The learning system 420 may be used for determining how to pick up other items in future jobs based on similarity of packaging, size, orientation, item type or other factors based on successes and failures of previous manipulation attempts recorded using the data store updater and retriever 425. Specifically, the learning system 420 may use machine learning to learn from human instructions and/or robot actions to inform future manipulation attempts, even when the robot is able to perform pick and place operations autonomously and without human assistance. In some examples, the human instructions, such as outlining of an item, may enable the robot to better learn how to segment items. Human instructions for placement of items at the destination may enable the robot to better learn how to place items. Human instruction for end effector selection may enable the robot to better learn how to grasp, suction or otherwise manipulate specific items and categories of items.

In one example, the computer instructions used by the controller 400 may provide a graphical user interface to the client device 460. For example, the graphical user interface may be a network page (e.g., a web page) accessed by the client device using a browser 465 (or other application), a processor 470 and a memory 475. The graphical user interface may enable drawing operations for drawing on the image. The graphical user interface may further enable drag and drop operations for dragging and dropping portions of the image identified by the drawing, such as for dragging an outlined or selected portion of an image from an origin or source to a destination.

In one example, the computer instructions used by the controller 400 may include machine learning code for learning from the pick and place instructions and avoiding requests to the client device 460 for future operations where a same or similar failure condition is encountered. The data store updater and retriever 425 may be used in conjunction with machine learning to improve the future operation of the robot.

In some examples, the instructions received from the client device may indicate that the robot cannot pick up the item. In such an instance the instructions may instead instruct the robot to request local human assistance. A local human operator may come and provide physical assistance in picking the item. An inability to pick the item may result from an unavailability of a suitable end effector, an item being too large, heavy, small, or the like for the robot to effectively pick up, and so forth. In another example, the instructions received from the client device 460 may not be instructions for picking up the item but rather instructions to enable the robot to pick up the item. For example, if an item cannot be found or is positioned in a way that makes picking up the item difficult, then the instructions may instruct the robot to jostle, shake, bump or tip the target item or a structure supporting the target item. In FIGS. 2A-2C, the toothpaste inventory item is propped up and leaning against a side of the container. Knocking the toothpaste box over, such as by knocking the end effector against the toothpaste box or the container containing the toothpaste may position the toothpaste better for identification, for picking, etc. With the toothpaste positioned better, the robot may be able to successfully perform the picking operation without further human assistance.

Client devices 460 may be available to access and interact with robot controllers 400 in an inventory management system over a network 440. Example client devices 460 may include, but are not limited to, a desktop computer, a laptop, a tablet, a mobile device, a television, a cell phone, a smart phone, a hand held messaging device, heads up display (HUD) glasses or any device with a display that may receive and present the message content.

The controller 400 or inventory management system may be implemented across one or more computing device(s) connected to a network 440. For example, a computing device may include a data store and various engines and/or modules such as those described above and such modules may be executable by a processor 445 of the computing device. The system may be implemented as a plurality of computing nodes or client devices 460, each of which comprises at least one processor and a memory, where the computing nodes are configured to collectively implement the modules, data stores and so forth.

The modules that have been described may be stored on, accessed by, accessed through, or executed by a computing device. The computing device may comprise, for example, one or more processors 470 and one or more memory modules 475. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Figure 5:
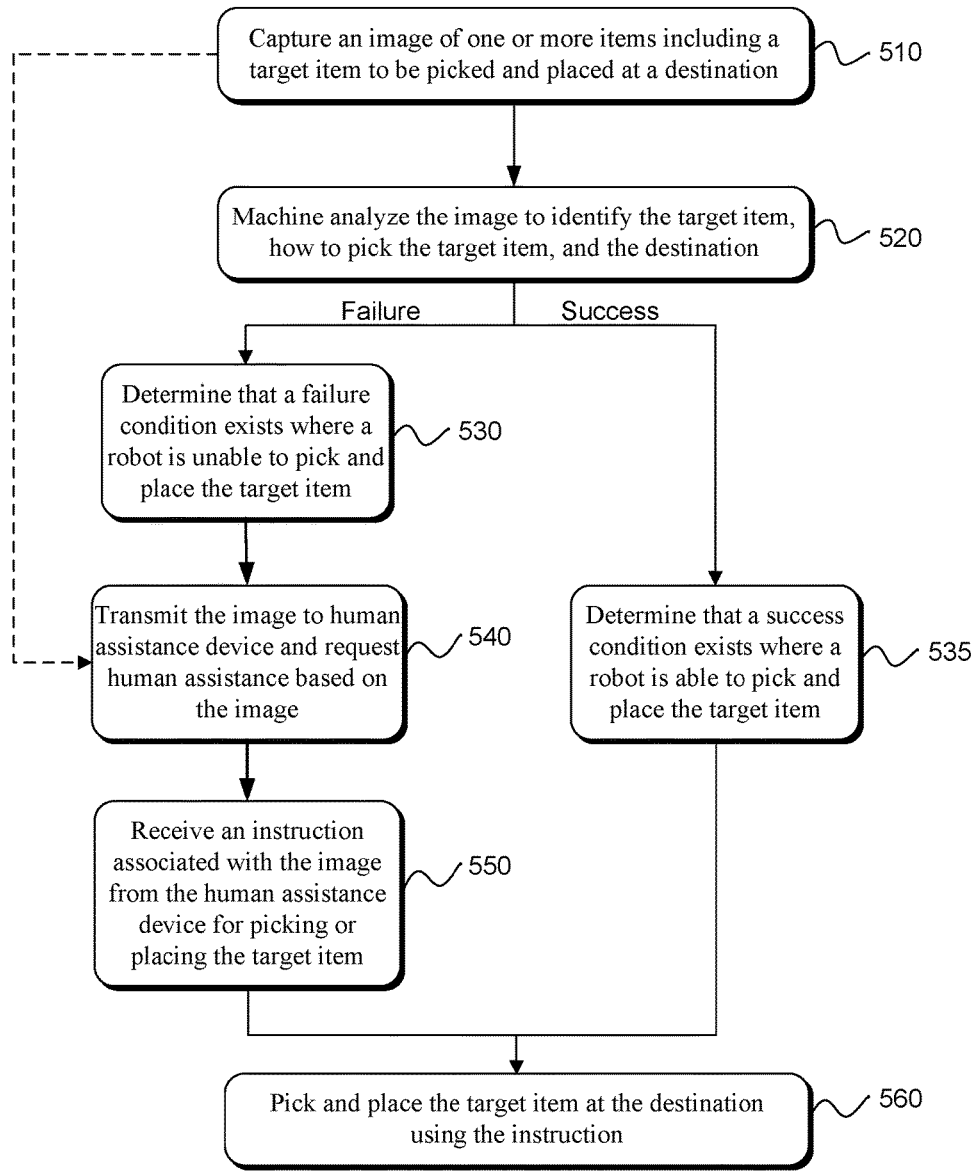
FIGS. 5-6 are flowchart diagrams that illustrate example methods for robot implemented picking in accordance with examples of the present technology.
Figure 6:
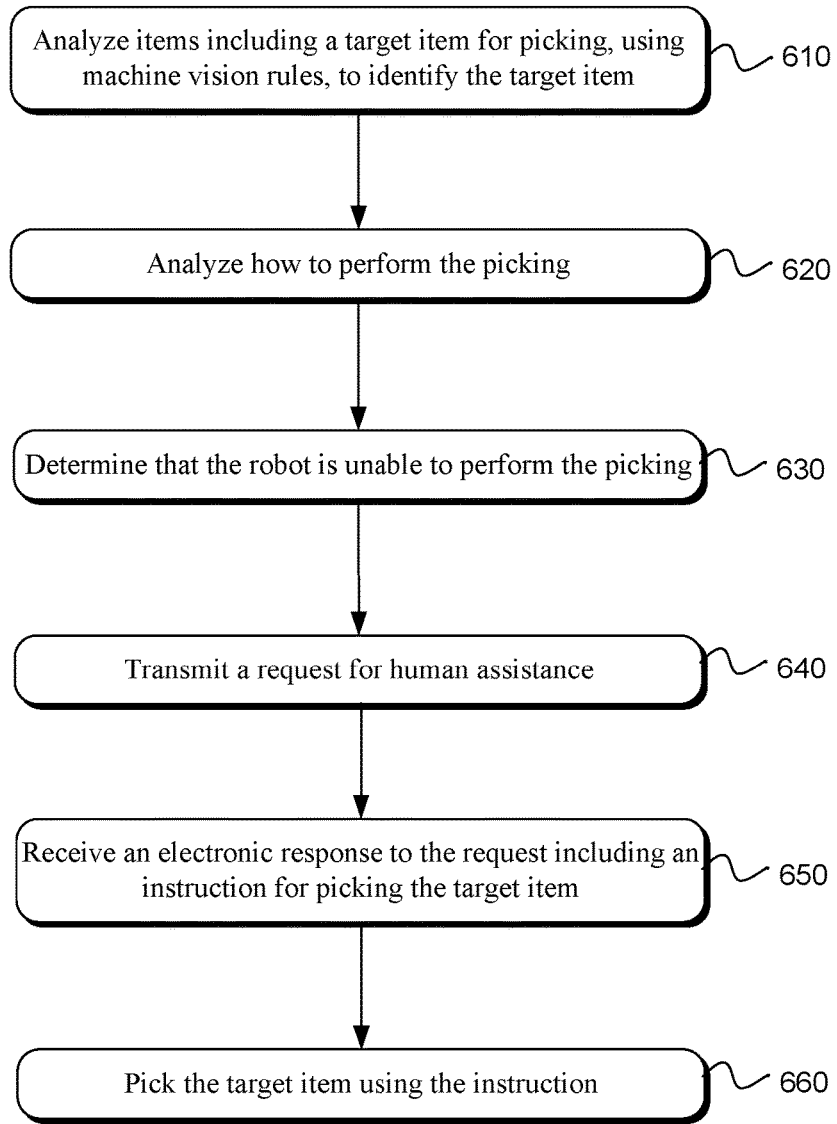

FIGS. 5-6 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 5, a flow diagram of a method is illustrated for human directed robotic pick operations. The method may include capturing 510 (or generating or otherwise obtaining) an image of the one or more items including the target item to be picked and placed at a destination. The method may include machine analyzing 520 the image to identify the target item, how to pick the target item, and the destination. A failure condition may be determined 530 to exist when the robot is unable to pick and/or place the target item. In such an instance, the image captured may be transmitted 540 to a human assistance device together with a request for human assistance, where the human assistance is to be provided based on the image. In response, an instruction associated with the image may be received 550 from the human assistance device for picking or placing the target item. The robot may proceed to pick and place 560 the target item at the destination using the instruction. If a success condition is determined 535 to exist instead of a failure condition, where the robot is able to pick and place the target item, then the robot may proceed to pick and place 560 the target item at the destination using a self-determined instruction rather than an instruction from a remote human operator.

In some examples, rather than attempting to analyze the image to attempt to pick and place the target item, the method may proceed directly from capturing the image at 510 to requesting human assistance at 540. Thus, a robot may operate in a human-assist mode where one or more pick and place operations may default to requesting human assistance regardless of whether the robot is capable of performing the operations autonomously.

In some examples, the instruction may include electronic markings on the image. Receiving the instruction may thus include receiving the marked image. The instruction may include at least one of an identification of a portion of the image representing the target item, identification of an end effector to use to pick up the target item, identification of where to pick up the target item, or identification of the destination.

In one example, capturing the image may include capturing a machine vision image (or rather an image for use in machine vision processing) using a first camera, and capturing a human-use image using a second camera in a different position relative to the robot than the first camera. The method may include machine analyzing the machine vision image and transmitting the human-use image. In another example, the image used in the machine analyzing and the transmitting is a same image captured by a same camera operated by the robot.

In some examples, this or other methods described herein may be implemented wholly or partially as computer readable program code executed by a processor and the computer readable code may be embodied on a non-transitory computer usable medium.

Referring now to FIG. 6, a flow diagram is illustrated for a robot implemented picking method. In this example, the method may include analyzing 610 one or more items including a target item for picking, using machine vision rules, to identify the target item, and further analyzing 620 how to perform the picking. Picking may include picking up and/or placing the target item. For example, picking may include placing the target item at a destination using the instruction autonomously and without human interaction.

When a determination 630 is made that the robot is unable to perform the picking, a request may be transmitted 640 requesting human assistance. The method may include capturing an image of the target item and transmitting the image with the request. An electronic response may be received 650 in response to the request which includes an instruction for picking the target item. The robot may pick 660 the target item using the instruction. For example, the instruction may include identification of a robotic arm end effector for use in picking up the target item.

The method may include electronically machine marking the image prior to the transmitting to identify at least one of: a portion of the image representing the target item, how to pick up the target item, where to pick up the target item, the destination, or what the item is. In this example, the electronic response may include additional markings correcting, replacing, or adding to the machine marking.

The systems and methods herein may be used in a variety of contexts and are not limited to robotic arms in a warehouse. For example, the robot may be a flying robot, such as a quadcopter or drone, used for delivering an inventory item to a customer. Transmitting the request may include transmitting an aerial image of a customer drop off zone with the request to a customer. The request may request the customer to identify the destination within the image of the customer drop off zone. Picking the target item may include releasing the target item at the destination. In one aspect, the instruction may relate to how to take off from a drop off zone without hitting trees or other obstructions. As another example, the robot may be used for packing a fuselage of an aircraft. The inventory items rather than being individual items to be packed in boxes may instead be the boxes themselves, which may include items packed therein. The instructions may thus relate to box packing and/or box moving. Any of a number of other examples will also be apparent.

Figure 7:
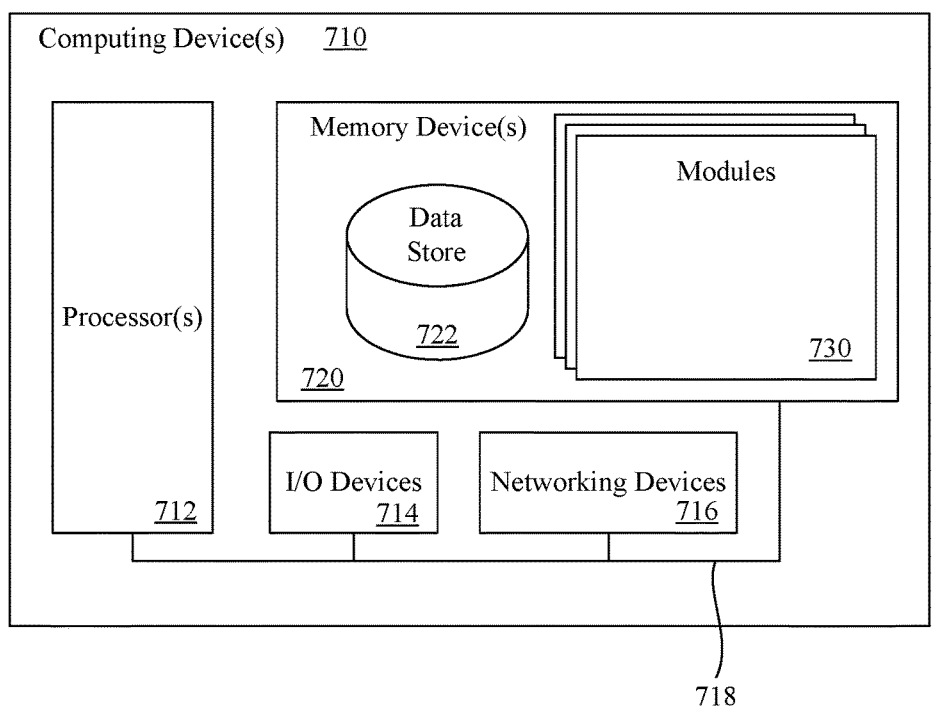
FIG. 7 is block diagram illustrating an example of a computing device that may be used to execute a method for robot implemented picking in accordance with an example of the present technology.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 730 that are executable by the processor(s) and data for the modules. A data store 722 may also be located in the memory device 720 for storing data related to the modules and other applications along with an operating system that is executable by the processor(s) 712.

The computing device 710 may further include or be in communication with a client device, which may include a display device. The client device may be available for an administrator to use in interfacing with the computing device 710, such as to review operation of a virtual computing instance, make improvements to machine learning models and so forth.

Various applications may be stored in the memory device 720 and may be executable by the processor(s) 712. Components or modules discussed in this description may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O devices may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two or more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI (Very Large Scale Integration) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory computer-readable medium comprising computer-executable instructions which, when executed by a processor, implement a method for human directed robotic pick operations, the method comprising:
    obtaining a first image of one or more items including a target item to be picked and placed at a destination;
    machine analyzing the first image to identify the target item, how to pick the target item, and the destination;
    determining a failure condition exists responsive to a robot being unable to pick and place the target item;
    transmitting, during a pick and place operation by the robot, the first image to a remote human assistance device and requesting human assistance based in part on the first image;
    receiving a second image from the remote human assistance device including image data having an electronic marking made to the first image with the remote human assistance device describing picking or placing the target item;
    analyzing the second image to identify the electronic marking; and
    picking and placing, by the robot, the target item at the destination using an instruction associated with the electronic marking.

2. The computer-readable medium of claim 1, further comprising analyzing the electronic marking to interpret the instruction.

3. The computer-readable medium of claim 1, wherein the instruction includes at least one of an identification of a portion of the image representing the target item, identification of an end effector to use to pick up the target item, identification of where to pick up the target item, or identification of the destination.

4. The computer-readable medium of claim 1, wherein:
    obtaining the image further comprises capturing a machine vision image using a first camera and capturing a human-use image using a second camera in a different position relative to the robot than the first camera;
    machine analyzing the image further comprises machine analyzing the machine vision image; and
    transmitting the image further comprises transmitting the human-use image.

5. The computer-readable medium of claim 1, wherein the image used in the machine analyzing and the transmitting is one image captured by one camera operated by the robot.

6. A robot implemented item manipulation method, comprising:
   analyzing one or more items including a target item for manipulation, using machine vision analysis, to identify the target item;
   determining that a robot is unable to perform the manipulation;
   transmitting, during a pick and place operation by the robot, a request for assistance to a remote human assistance device;
   receiving an electronic response to the request from the remote human assistance device, the response including image data of an electronic marking made using the remote human assistance device to provide an instruction for manipulating the target item;
   interpreting the electronic marking in the image data of the response into a robot-usable instruction; and
   manipulating, by the robot, the target item using the robot-usable instruction.

7. The method of claim 6, wherein manipulating the target item comprises placing the target item at a destination autonomously using the instruction.

8. The method of claim 6, further comprising determining from the instruction an identification of a robotic arm end effector for use in picking up the target item.

9. The method of claim 6, further comprising:
   marking an image of the target item electronically to identify at least one of: a portion of the first image representing the target item, how to pick up the target item, where to pick up the target item, a destination, or what the item is; and
   transmitting the image to the remote human assistance device with the request.

10. The method of claim 9, further comprising identifying additional markings on the image when received with the electronic response from the human assistance device, wherein the additional markings indicate at least one of: correcting, replacing, or adding to the markings made to the image prior to the transmitting to the remote human assistance device.

11. The method of claim 6, wherein the robot is a flying robot and transmitting the request comprises transmitting an aerial image of a customer drop off zone with the request to a customer, the request further requesting the customer to identify the destination within the aerial image of the customer drop off zone, wherein manipulating the target item comprises releasing the target item at the destination.

12. The method of claim 6, further comprising:
   embedding first metadata into a first image of the target item to identify at least one of: a portion of the image representing the target item, how to pick up the target item, where to pick up the target item, a destination, or what the item is;
   transmitting the first image to the remote human assistance device with the request for assistance; and
   identifying second metadata in a second image received with the electronic response, wherein the second metadata indicates at least one of: correcting, replacing, or adding to the first metadata embedded in the first image.

13. A robotic picking system, comprising:
   a robot with an arm having at least one end effector configured to pick up items;
   an imaging device configured to capture images of the items accessible to the robot with the arm;
   a network adapter to enable electronic communications between the robot and a remote human assistance device over a network;
   a processor of the robot;
   a memory of the robot in electronic communication with the processor; and
   computer instructions stored in the memory, the computer instructions being executable by the processor to:
      capture a first image of a target item using the imaging device;
      transmit, during a pick and place operation by the robot, the first image to the remote human assistance device using the network adapter;
      receive a second image from the human assistance device using the network adapter;
      analyze image data in the second image to identify image markup made on the first image using the remote human assistance device to provide pick and place instructions for picking and placing the target item; and
      actuate the arm to pick up the target item and to place the target item at a destination based on the pick and place instructions in the second image.

14. The robotic picking system of claim 13, wherein the pick and place instructions include at least one of: the image markup providing an outline of the target item on the second image, the image markup providing a line designating an orientation of the at least one end effector for picking up the target item, the image markup identifying a destination for placing the target item, the image markup identifying an orientation of the target item for placing at the destination, the image markup identifying where on the target item to pick up the target item, or the image markup identifying which of a plurality of available end effectors to use to pick up the target item.

15. The robotic picking system of claim 13, wherein the pick and place instructions are non-alphanumeric and include one or more lines or shapes.

16. The robotic picking system of claim 13, wherein the computer instructions are further configured to provide a graphical user interface to the remote human assistance device, the graphical user interface enabling drawing operations for drawing on the first image and for enabling drag and drop operations for dragging and dropping portions of the first image identified by the drawing to generate the image markup in the image data of the second image.

17. The robotic picking system of claim 13, wherein the computer instructions further comprise machine learning code configured to learn from the pick and place instructions to at least one of segment the target item from other items in the first image, place the target item at the destination or manipulate the target item in order to avoid requests to the human assistance device for future operations.

18. The robotic picking system of claim 13, wherein the pick and place instructions indicate that the robot cannot pick up the item and instruct the robot to request local human assistance.

19. The robotic picking system of claim 13, wherein the pick and place instructions instruct the robot to at least one of jostle, shake, bump or tip the target item or a structure supporting the target item.

20. The robotic picking system of claim 13, wherein the first image comprises streaming video or a three dimensional model.

* * * * *